United States Patent [19]
Huhta-Koivisto

[11] 3,861,957
[45] Jan. 21, 1975

[54] DEVICE IN A GALVANIC BATTERY FOR FORMING ELECTROLYTE

[75] Inventor: Esko Ensio Huhta-Koivisto, Helsinki, Finland

[73] Assignee: Puolustusministerio, Helsinki, Finland

[22] Filed: Oct. 25, 1972

[21] Appl. No.: 300,667

[30] Foreign Application Priority Data
Oct. 25, 1971 Finland .............................. 3016/71

[52] U.S. Cl. ................ 136/83 R, 136/160, 136/162
[51] Int. Cl. .......................................... H01m 23/02
[58] Field of Search ....... 136/83 R, 100 R, 160, 162

[56] References Cited
UNITED STATES PATENTS

| | | | |
|---|---|---|---|
| 2,921,111 | 1/1960 | Crowley et al. ...................... | 136/162 |
| 3,247,024 | 4/1966 | Tanninen ............................. | 136/160 |
| 3,257,241 | 6/1966 | Tamminen ........................... | 136/160 |
| 3,498,845 | 3/1970 | Koivisto .............................. | 136/162 |

*Primary Examiner*—Donald L. Walton
*Attorney, Agent, or Firm*—Richards & Geier

[57] ABSTRACT

A device for forming electrolyte to be injected into the cell system of a galvanic battery of the special kind which is capable of high output during a comparatively short period. The cell system is composed of, preferentially bipolar, electrode plates into whose interstices electrolyte is supplied through an input duct. The electrolyte consists of water admixed with sulphuric and chromic acid, the water being supplied under pressure from a pressure souce and the chromic acid being formed during operation of the battery by dissolving a chrome compound in water. The invention is particularly characterized in that the battery comprises, for the purpose of forming chromic acid, a tank which is filled with chrome trioxide or with a slat of hexavalent chromic acid, into which tank water is supplied through its upper part and allowed to pass slowly downwarldy, the chromic acid thus produced being drawn off through the lower part of the tank. The initial rise of the chromic acid concentration in the electrolyte supplied to the battery after it has been started up can be enchanced by providing in the water supply pipe leading to the electrolyte imput duct, a chrome compound cartridge delivering chromic acid into the water flowing through. The cell system of the battery and its sulphuric acid tank may be placed in an enclosed housing, the remaining space of which is filled with a chrome compound, thus serving as a chromic acid forming tank. The sulphuric acid may be disposed in a collapsible bag, from which it is driven into the system by water pressure.

3 Claims, 4 Drawing Figures

PATENTED JAN 21 1975  3,861,957

DEVICE IN A GALVANIC BATTERY FOR FORMING ELECTROLYTE

The present invention concerns, in a galvanic battery, a device for forming electrolyte, in which battery the cell system consists of most appropriately bipolar electrode plates, consisting e.g. of zinc and carbon, and into which battery cell system electrolyte is supplied through an input duct, said electrolyte consisting of water supplied into the battery under effect of a pressure source and of chromic and sulphuric acid, and chromic acid being formed of chrome trioxide or a salt of hexavalent chromic acid when these are solved in water. When speaking generally of chrome compounds in the following, these are indeed understood to be the above-mentioned chrome trioxide and salts of hexavalent chromic acid.

In a number of applications where batteries are used, such as in airplanes, missiles, torpedoes, various types of emergency powerplant equipment and particularly in starting-up duty, a battery is required which has a high output while its running time is comparatively short and which at the same time is light and has a good storage tolerance. It is furthermore required that the voltage of the battery is substantially constant throughout the running period despite high load.

Prior art includes, in the applications mentioned, various types of batteries which when the demand for power begins are activated by filling the cell system of the battery which electrolyte and forcing the electrolyte to circulate in the cell system. The battery is dry prior to commissioning, whereby it has a good storage tolerance. An example of this kind of battery is the seawater battery employed in electric torpedoes, wherein magnesium and silver chloride serve as electrodes and sea water as electrolyte. A less expensive battery type is that wherein zinc, or an equivalent metal, constitutes the negative electrode and carbon constitutes the positive electrode and wherein a mixture of sulphuric and chromic acid is used as electrolyte. Various batteries of the kinds considered above have been disclosed e.g. by the Finnish Pat. No. 37,338 (corresponding to U.S. Pat. No. 3,498,845) and in U.S. Pat. Nos. 2,921,111 and 3,247,024.

Of the above-mentioned patents, U.S. Pat. No. 2,921,111 discloses a battery wherein the electrolyte is a solution of water and of chromic and sulphuric acid, and in this battery the chromic acid is formed in a particular tank containing a chrome compound by the means of supplying water into this tank and which water dissolves the chrome compound, whereby chromic acid is formed. This chromic acid forming tank of prior art contains a plurality of baffle plates spaced at a small distance so that within the tank a flow path is formed which has a small cross sectional area compared with the cross section of the tank as a whole, and in which flow path the water dissolving the chrome compound attains a fairly high velocity of flow. It is a drawback of a chromic acid forming tank of this type that the concentration of the chromic acid produced is not constant, because as the chrome compound decreases in quantity the resistance of the flow path becomes less and the water throughout per unit time increases, thus causing the concentration of the chromic acid produced to decrease. It is apparently for this reason that it has been necessary in the battery according to the U.S. Pat. No. 2,921,111 to use voltage-sensitive control devices and valves, which maintain the quantity of water passing through the chromic acid forming tank per unit time substantially constant. The first object of the present invention is to provide a chromic acid forming tank from which chromic acid of uniform concentration is obtained as long as there is chrome compound in the tank, without need to use any particular control devices to this purpose. Another object is to provide a forming tank which may be greatly variable in shape, so that in the capacity of this tank spaces may be utilized which are left over after placement of the outer components of the battery, with the aim of achieving a highly compact design of the battery as a whole. It is moreover an object of the invention to provide a forming tank which while it contains an inactive chrome compound is well tolerant with regard to storage and is not subject to corrosion.

The objects of the invention are achieved and the drawbacks outlined in the forgoing are avoided by means of a device mainly characterized in that the battery comprises for the purpose of forming chromic acid, a tank which is filled with chrome trioxide or a salt of hexavalent chromic acid and that into the upper part of the tank water is supplied, which in the course of its slow downward flow in the tank dissolves chrome compound so that the concentration of the chromic acid produced increases in the downwardly direction in the tank, and that the chromic acid for introduction into the battery cell system is drawn from the lower part of the tank.

The invention is described in detail with reference to the embodiment examples illustrated by the figures in the attached drawing, but to which the invention is not confined.

FIG. 1 shows the principle diagram of the battery with all its equipment.

In FIG. 2 a compact embodiment example of the battery has been depicted, and at the same time FIG. 2 is a section along the line II—II in FIG. 3.

Figure 1:
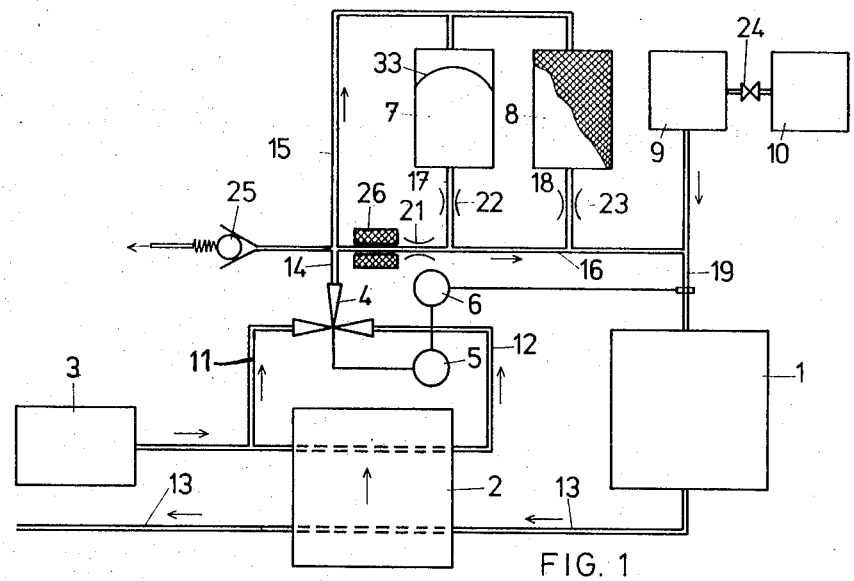

The battery according to the embodiment example consists of a battery cell system 1, provided with bipolar zinc-carbon electrode plates 31, into whose interstices electrolyte is supplied through the input duct 19. After having circulated once through the battery cell system, the spent electrolyte is conducted from the battery cell system into the discharge duct 13, which passes through a heat exchanger 2 so that the spent electrolyte serves as heat donor in the heat exchanger 2. According to the invention, only one pressure source 3 is needed in the battery, by means of which water is supplied into the battery for dilution of the electrolyte and for its supplying. The pressure source 3 may be, for instance, a pump, which may be replaced e.g. in torpedoes or in other application objects of the battery travelling through water, by devices which produce a dynamic pressure. It is obvious that the pressure source 3 may comprise a pump and dynamic pressure both.

Subsequent to the pressure source 3, the water supply duct divides into two branches, of which the first branch 11 by-passes the heat exchanger 2 and the other branch goes through the heat exchanger 2. In the heat exchanger 2 heat is transferred into the water from the spent electrolyte, which has been heated in the battery cell system 1. For control of the proportions of water passing through the heat exchanger 2 and water passing it by, and for keeping the tamperature constant, there is a control valve 4 consisting of a three-way valve, which is actuated by an actuator 5, which in its turn is governed by an electrolyte temperature sensing element 6, which monitors the electrolyte temperature e.g. in the electrolyte input duct 19. The abovementioned branches 11 and 12 of the water supply duct merge after the control valve 4 to become the supply duct 14, which in its turn divides into two branches, the first branch 15 being carried to the electrolyte tanks 7 and 8 and the second branch 16 to the electrolyte input duct 19. The control valve 4 may equally be located before the heat exchanger.

In the embodiment example there are two electrolyte tanks 7 and 8, one of them 7 containing sulphuric acid and the other 8 containing a chrome compound, such as chrome trioxide, of which chromic acid is formed upon its dissolution in the supply water. The sulphuric acid is disposed in the tank 7 in a compressible bag of an appropriate material, from which the water pressure drives sulphuric acid through the supply pipe 17 into the branch 16 of the water supply duct. The branch 15 of the water supply duct also conducts water to the tank 8 containing a chrome compound, and the chromic acid formed in this tank is conducted through the supply pipe 18 into the branch 16 of the water supply duct. In the electrolyte supply pipes 17 and 18 and in the initial part of the branch 16 of the water supply duct there are flow throttling means 22, 23 and 21, respectively, by the aid of which, firstly, the pressure distribution in the ducts is adjusted to be such that the electrolyte components flow from their tanks 7 and 8 into the supply duct branch 16 in the first place. The second purpose of the flow throttling means 21, 22 and 23 is that by their aid the mutual proportions of the different electrolyte components and the concentration of the electrolyte are maintained constant with an adequate accuracy. In the branch 14 of the water supply duct a pressure regulating valve 25 has been fitted, which keeps the water supply pressure constant even if the pressure of the pressure source 3, such as a dynamic pressure, should vary considerably.

In order to initiate the operation of the battery, the battery comprises an initial electrolyte tank 9, which in this case contains a ready-made mixture of sulphuric and chromic acid. For the purpose of driving the initial electrolyte into the battery cell system 1 there is a particular pressure vessel 10, under effect of the pressure in which, after the valve 24 has been opened, the initial electrolyte goes into the battery cell system 1.

According to the invention, the battery comprises for the purpose of forming chromic acid, a tank 8 which is filled with a chrome compound, most appropriately with chrome trioxide. Water is supplied into the upper part of this tank 8 and is allowed to flow downwardly at a slow rate. The water will then dissolve chrome compound, and chromic acid is formed, the concentration of which increases in a downwardly direction in the tank 8 because the density of chromic acid (about 1.7 g/cm$^3$) is higher than that of water. The flow cross section in the tank 8 is rather large, whereby correspondingly the flow rate will be quite small, and there are no flow ducts increasing the velocity of flow in the tank 8. The chromic acid produced is drawn through the supply pipe 18 from the lower part of the tank 8, where its concentration is highest.

Figure 4:
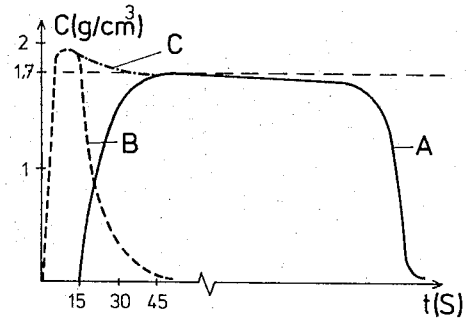
FIG. 4 shows the concentration C of the chromic acid obtained from a forming tank according to the invention, as a function of time (curve A). Furthermore, in FIG. 4 the chromic acid concentration has been shown which is obtained with a starting cartridge (curve B), as well as the sum curve (C) of curves A and B.

As can be seen from the curve, experimentally obtained, which has been reproduced as curve A in FIG. 4, the concentration C of the chromic acid obtained from a forming tank 8 of the kind described surprisingly remains substantially constant as long as there is chrome compound in the tank. The concentration C of the chromic acid obtained from the tank 8 reaches its full height (about 1.7 g/cm$^3$) about 30 seconds after one has begun to conduct water into the tank. Correspondingly, at the final phase of the operation of the tank 8, the concentration C falls from its full value to nearly zero in as little as about 15 seconds, from which it is understood that the chrome compound present in the tank 8 can be utilized substantially in toto.

If fast start-up is required, it is possible to provide in the branch 16 of the water supply pipe a chrome compound cartridge 26. When the water passes through the chrome compound cartridge 26, chromic acid is formed, at first at a rather high rate, which decreases as the cartridge 26 is depleted. The concentration C of the chromic acid obtained from the chrome compound cartridge 26 is represented by the curve B in FIG. 4. The cartridge 26 has been so dimensioned that at the initial phase, by the combined action of this cartridge and of the tank 8, a substantially constant chromic acid concentration (curve C in FIG. 4) is obtained for the electrolyte supplied into the input duct. When the action of the tank 8 has reached a stationary condition, the cartridge 26 has also been used up.

Figure 2:
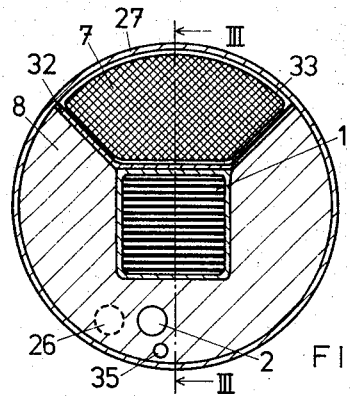
Figure 3:
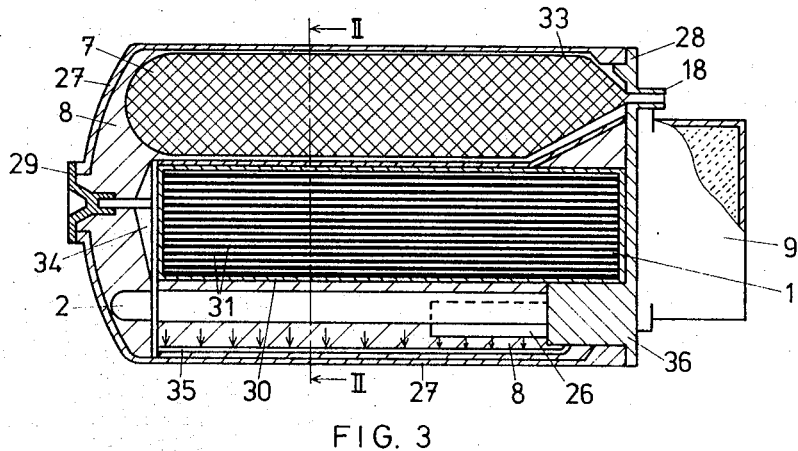
FIG. 3 shows the section along the line III—III in FIG. 2.

In FIGS. 2 and 3 a design example of a battery employing a chromic acid forming tank 8 according to the invention has been shown. In these figures, the sulphuric acid space is indicated by cross-hatching, the chrome compound space by slant hatching, and the initial electrolyte space by interrupted hatching. The battery together with its various pieces of equipment has been fitted in a housing having a cylindrical mantle 27 and a planar end part 28. The other end has an aperture closed by a cover 29, with the aid of which and by means of the bracket component 34 the cell system 1 of the battery is fixed within the housing. In the upper part of the housing, a space has been compartmented by partitions 32 for the sulphuric acid tank 7. The sulphuric acid resides in this tank 7 in a bag 33 of compressible material. The housing contains below the sulphuric acid tank 7, in its cover, the battery cell system 1, which is composed of electrode plates 31. Under the cell system 1, the heat exchanger 2, having a tubular mantle, and the chrome compound cartridge 26 have been placed. The initial electrolyte tank 9 has been affixed to one edge of the end part 28, outside the housing. The lower side of the end portion 28 has a thickened part 36 for the bored ducts leading to the tank 8. All of the rest of the spaces within the housing are filled with chrome compounds in order to produce the chromic acid forming tank 8, and water is conducted into the chrome compound spaces, as has been described, into the upper part of the tank; correspondingly, the chromic acid that is formed is drawn from the lower part of the tank 8 through the pipe 35, which has been perforated and extends substantially over the entire length of the tank 8. In this manner a highly compact design of the battery has been achieved, in which all spaces are assigned to useful duties. The design just described is appropriate for use, for instance, for the energy source of an electric torpedo, and it is well resistant to the impacts experienced, for instance, when the torpedo is launched into the water from a height.

Furthermore, the battery constitutes a part of the torpedo so that all components have been brought into a uniform pressure condition in a space which is not subject to external pressure variations.

I claim:

1. A device in a galvanic battery for forming electrolyte, said battery having a cell system consisting of bipolar electric plates, said device comprising an input duct connected to the battery, a tank having a top duct and a bottom duct, means connecting said bottom duct with said input duct, a pressure source, and means connecting said pressure source and with said top duct for supplying water into the upper part of the tank, said tank being filled with a chrome compound, whereby water, in the course of its downward flow in the tank dissolves said chrome compound to increase concentration of chromic acid in the downwardly direction in the tank, the chromic acid being supplied to the battery through said lower duct of the tank, and a sulphuric acid tank, said cell system and said sulphuric acid tank being located within the first-mentioned tank.

2. Battery according to claim 1, characterized in that for the purpose of achieving a requisite chromic acid concentration when the battery is started in a branch of the water supply pipe leading to the electrolyte input duct a chrome compound cartridge has been provided, chromic acid being formed when the water flows through this cartridge.

3. Battery according to claim 1, intended in particular for use as energy source in electric torpedoes, characterized in that the battery has been disposed within a housing containing within itself a sulphuric acid tank, in which the sulphuric acid is kept in a compressible bag of appropriate material, and that the housing contains within itself the battery cell system in its cover, the remaining spaces of the housing constituting a tank filled with chrome salt for the purpose of forming chromic acid.

* * * * *